United States Patent
Babitch

(10) Patent No.: US 9,344,264 B2
(45) Date of Patent: May 17, 2016

(54) REVERSIBLE RADIO ARCHITECTURE BETWEEN TRANSMISSION AND RECEPTION FUNCTIONS IN A MOBILE COMMUNICATION SYSTEM

(71) Applicant: Samsung Electronics Co., Ltd., Gyeonggi-do (KR)

(72) Inventor: Daniel Babitch, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 43 days.

(21) Appl. No.: 14/273,015

(22) Filed: May 8, 2014

(65) Prior Publication Data

US 2015/0124662 A1    May 7, 2015

Related U.S. Application Data

(60) Provisional application No. 61/899,585, filed on Nov. 4, 2013.

(51) Int. Cl.
*H04B 7/005* (2006.01)
*H04L 5/14* (2006.01)
*H04B 7/26* (2006.01)

(52) U.S. Cl.
CPC ............ *H04L 5/1461* (2013.01); *H04B 7/2643* (2013.01); *H04L 5/1469* (2013.01)

(58) Field of Classification Search
None
See application file for complete search history.

(56) References Cited

U.S. PATENT DOCUMENTS

| | | | |
|---|---|---|---|
| 5,255,111 A | 10/1993 | Kwa | |
| 7,408,996 B2 | 8/2008 | Hershbarger et al. | |
| 8,059,963 B2 * | 11/2011 | Kim et al. | 398/115 |
| 2002/0098821 A1 * | 7/2002 | Struhsaker | 455/305 |
| 2012/0062366 A1 | 3/2012 | Pappu et al. | |
| 2013/0225088 A1 * | 8/2013 | Anderson | 455/62 |

* cited by examiner

*Primary Examiner* — Kibrom T Hailu
(74) *Attorney, Agent, or Firm* — The Farrell Law Firm, P.C.

(57) ABSTRACT

Disclosed is a reversible Time Division Duplex (TDD) and/or Time Division Multiple Access (TDMA) radio architecture between Transmission (Tx) and Reception (Rx) functions in a mobile communication system. Accordingly, all of the blocks/components in a Tx/Rx Radio Frequency unit are reversible between Tx and Rx functions. As such, the blocks/components are adapted to bi-directionally process a signal, either in a Tx or Rx direction, based on switching.

17 Claims, 2 Drawing Sheets

REVERSIBLE RADIO ARCHITECTURE BETWEEN TRANSMISSION AND RECEPTION FUNCTIONS IN A MOBILE COMMUNICATION SYSTEM

PRIORITY

This application claims priority under 35 U.S.C. §119(e) to U.S. Provisional Application Ser. No. 61/899,585, which was filed in the U.S. Patent and Trademark Office on Nov. 4, 2013, the contents of which are incorporated herein by reference.

BACKGROUND OF THE INVENTION

1. Field of the Invention

The present invention relates generally to reversible radio architecture, and more particularly, to a reversible Time Division Duplex (TDD) and/or Time Division Multiple Access (TDMA) radio architecture between Transmission (Tx) and Reception (Rx) functions in a mobile communication system.

2. Description of the Related Art

The Long Term Evolution (LTE) and LTE-Advanced (LTE-A) mobile communication systems, developed by the 3rd Generation Partnership Project (3GPP) standardization organization, adopt Orthogonal Frequency Division Multiplexing (OFDM) technology instead of the conventional Code Division Multiple Access (CDMA) technology. OFDM is a multi-carrier transmission scheme using multiple carriers for data transmission.

The LTE and LTE-A standard techniques are divided into TDD and Frequency Division Duplex (FDD) air-interface systems. In the FDD system, two different frequencies are used for uplink and downlink transmission, and the Base Station (BS) and User Equipment (UE) may send and receive data simultaneously. In the TDD system, the same frequency is used for uplink and downlink transmission, and the BS and UE cannot send and receive data simultaneously.

FIG. 1 illustrates architecture for a TDD/TDMA RF unit 100 according to the prior art.

In FIG. 1, a signal transmitted or received by a Tx/Rx antenna 105 is sent to a Tx/Rx switch 110, which controls the TDD/TDMA RF unit 100 to switch between uplink and downlink operations. When the TDD/TDMA RF unit 100 is applied to a UE, the Tx/Rx switch 110 performs switching between downlink Rx and uplink Tx, whereas when the TDD/TDMA RF unit 100 is applied to a BS, the Tx/Rx switch 110 performs switching between downlink Tx and uplink Rx.

The Tx/Rx switch 110 includes a filter and a Power Amplifier (PA). The filter serves two functions in a TDD or TDMA transceiver: (1) Rejection of undesired signals at frequencies different from the desired signals during the Rx period. This rejection reduces the effect which the undesired receive signals have on the performance of the desired receive signals. (2) Reduction of transmit frequency sidebands which can cause interference to other transceivers during the Tx period. Meanwhile, the PA strengthens the transmit (outgoing) signal. The PA is only turned on during the Tx period; otherwise, it is turned off so as to not interfere with the receive function.

On the Rx side, the Tx/Rx Switch 110 sends the signal to a Low-Noise Amplifier 115, where the signal is processed and sent to a Down-Converter 120 (i.e. Mixer) where the signal is down-converted. The resultant signal is sent to an Rx Filter 125, such as a Wi-Fi or Bluetooth® (BT) Receiver, which filters and sends the signal to an Analog-to-Digital Converter (ADC) 130 where it is converted to digital and then output. A Local Oscillator 150 may also provide a signal to the Down-Converter 120. On the Tx side, a Digital-to-Analog Converter (DAC) 135 converts a digital signal to analog and sends the resultant signal to a Tx Filter 140, such as a Wi-Fi or BT Transmitter, for filtering. The filtered signal is sent to an Up-Converter 145 (i.e. Mixer), where the signal is up-converted and sent to a Driver 155, which amplifies the signal and sends the amplified signal to the Tx/Rx Switch 110 for transmission. The Local Oscillator 150 may also provide a signal to the Up-Converter 145.

The conventional TDD/TDMA RF unit, as applied to a BS for example, can perform either downlink Tx or uplink Rx of data using physically separate circuit blocks alternately in time, but is not adapted to perform both Tx and Rx of data re-using the same circuits for both functions. As such, there is a need in the art for RF architecture that enables both Tx and Rx functions using the same components, in a mobile communication system.

SUMMARY OF THE INVENTION

Accordingly, the present invention is designed to address at least the problems and/or disadvantages described above and to provide at least the advantages described below. As such, an aspect of the present invention provides a TDD/TDMA Transceiver (Tx/Rx) architecture that is provided with a single, but reversible and bi-directional, chain of Tx/Rx components.

According to an aspect of the present invention, an apparatus for data transmission and reception in a mobile communication system includes an antenna, a first switch configured to connect to the antenna and to bi-directionally process a signal, an amplifier configured to connect to the first switch and to bi-directionally amplify the signal, a mixer configured to connect to the amplifier and to bi-directionally first convert the signal, a filter configured to connect to the mixer and to bi-directionally filter the signal, and a converter configured to connect to the filter and to bi-directionally second convert the signal.

According to an aspect of the present invention, a method for data transmission and reception in a mobile communication system includes processing, by a first switch connected to an antenna, a signal in one of bi-directions, amplifying, by an amplifier connected to the first switch, the signal in the one of bi-directions, first converting, by a mixer connected to the amplifier, the signal in the one of the bi-directions, filtering, by a filter connected to the mixer, the signal in the one of the bi-directions, and second converting, by a converter connected to the filter, the signal in the one of the bi-directions.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for the sake of clarity and conciseness.

Embodiments of the present invention enable all of the blocks/components in a Tx/Rx chain to be reversible between Tx and Rx functions. The result is similar to achieving half of a radio that can perform either Tx or Rx operations. Embodiments of the present invention take advantage of the fact that many of the blocks/components in the conventional TDD radio architecture have similarities in the Tx and Rx chains. Moreover, many ADC's also include DAC's, such that the ADC and DAC functions of the Tx/Rx unit of the present invention can be made compatible.

Figure 1:
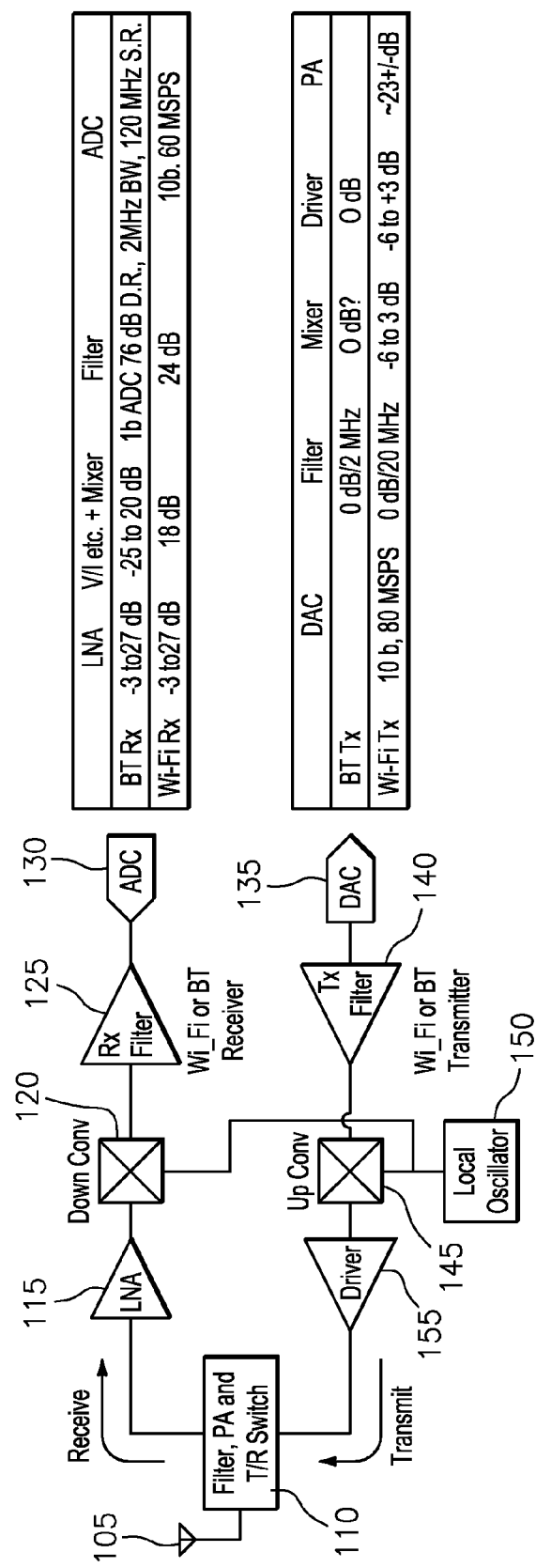
FIG. 1 illustrates architecture for a TDD/TDMA RF unit according to the prior art.
Figure 2:
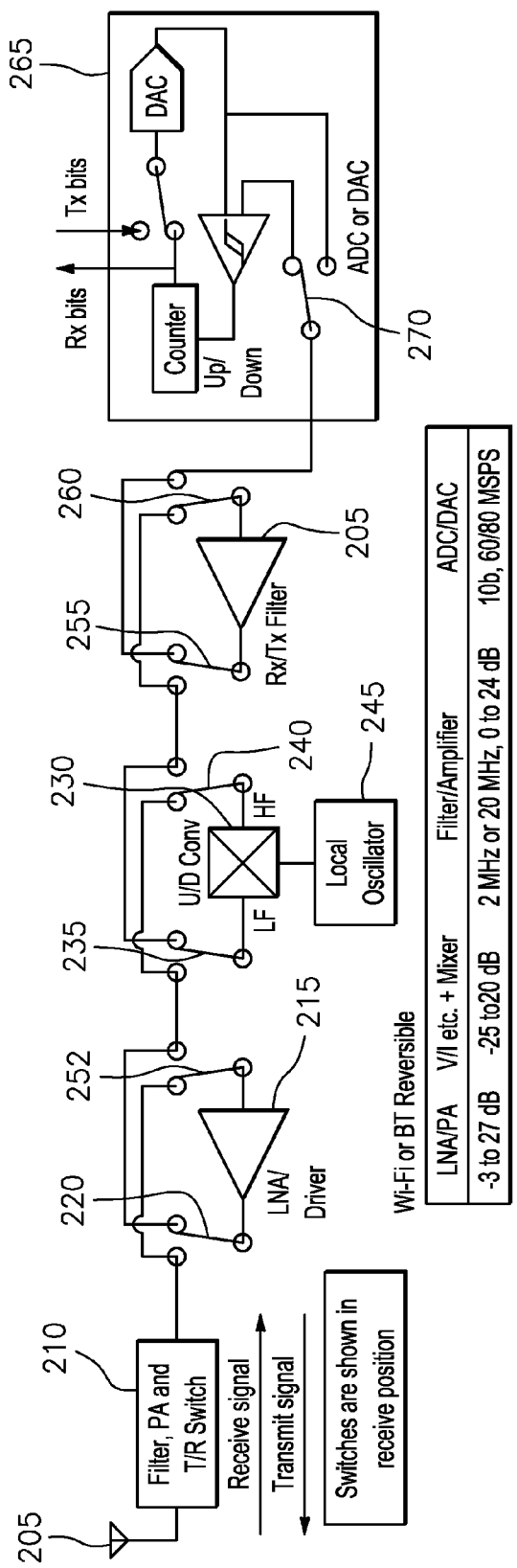
FIG. 2 illustrates reversible architecture for a TDD/TDMA Tx/Rx unit according to an embodiment of the present invention.

FIG. 2 illustrates reversible architecture for a TDD/TDMA Tx/Rx unit 200 according to an embodiment of the present invention. Since some of the components in the Tx/Rx unit 200 are a combination of components in the previously described TDD/TDMA RF unit 100, these components will not be described in detail below.

In FIG. 2, a signal transmitted or received by a Tx/Rx antenna 205 is sent to a Tx/Rx switch 210, which controls the TDD/TDMA RF unit 100 to switch between uplink and downlink operations. That is, the signal may be switched between the Tx direction (i.e., as shown by the "Transmit Signal" arrow in FIG. 2) and the Rx direction (i.e., as shown by the "Receive Signal" arrow in FIG. 2) in a bi-directional manner.

On the Rx side, the Tx/Rx Switch 210 either sends the signal to or, in reverse, receives the signal from, a combined Low-Noise Amplifier/Driver (LNA/Driver) 215, depending on the connection of switches 220 and 225. The LNA/Driver 215 performs the functions of both the Low-Noise Amplifier 115 and Driver 155 of the TDD/TDMA RF unit 100. An Up/Down-Converter 230 (i.e. Mixer) either up-converts a signal received from a Tx/Rx Filter 250 or down-converts a signal received from the LNA/Driver 215, depending on the connection of at least switches 235 and 240. A Local Oscillator 245 may also provide a signal to the Up/Down-Converter 230. The Tx/Rx Filter 250, such as a Wi-Fi or Bluetooth® (BT) Transmitter and Receiver, either Rx filters and sends the signal to an ADC/DAC 265 where it is converted to digital, or Tx filters a signal converted from digital to audio by the ADC/DAC 265 and sends the resultant signal to the Up/Down-Converter 230, depending on the connection of at least switches 255 and 260, switch 270, which determines the Analog-to-Digital or Digital-to-Analog mode of ADC/DAC 265, and switch 275, which switches between Tx and Rx bits.

In FIG. 2, each of the switches 220, 225, 235, 240, 255, 260, 270 and 275 is shown in the receive position. That is, the signal is propagating in the Rx direction. When switches 220, 235 and 255 are switched to the left, switches 225, 240 and 260 are switched to the right, switch 270 is switched downward and switch 275 is switched upward to the "Tx bits" contact in FIG. 2, the signal propagates in the Tx direction. When the TDD/TDMA Tx/Rx unit 200 is applied to a UE, the Tx/Rx switch 210 performs switching between downlink Rx and uplink Tx, whereas when the TDD/TDMA Tx/Rx unit 200 is applied to a BS, the Tx/Rx switch 210 performs switching between downlink Tx and uplink Rx.

Compared to the TDD/TDMA RF unit of the prior art, the architecture of the TDD/TDMA Tx/Rx unit 200 according to the present invention is substantially streamlined, includes a smaller transceiver area, and can be implemented in a bi-directional manner in multi-function radios such as Wi-Fi and Bluetooth®.

In addition, although the TDD/TDMA Tx/Rx unit according to the present invention implements additional switches as compared to those in the TDD/TDMA RF unit of the prior art, the integrated circuit switches may be very small as long as the source and load impedance are not unfavorable and the power level is reasonably maintained. Furthermore, the TDD/TDMA Tx/Rx unit according to the present invention, when implemented in Wi-Fi and Bluetooth® radios as discussed, will not incur complications when simultaneously operating in FDD mode, so long as the local oscillator 245 can change frequency fast enough to support the TDD rate.

Advantages herein are apparent in an implementation that is largely integrated rather than one of discrete circuit blocks. Complete end-to-end integration is not required to provide many of the advantages herein.

The embodiments of the present invention can also be embodied as computer-readable codes on a computer-readable recording medium. The computer-readable recording medium is any data storage device that can store data that can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices. The computer-readable recording medium can also be distributed over network-coupled computer systems so that the computer-readable code is stored and executed in a distributed fashion. Additionally, function programs, codes, and code segments for accomplishing the present invention can be easily construed as within the scope of the invention by programmers skilled in the art to which the present invention pertains.

While the present invention has been particularly shown and described with reference to certain embodiments thereof, it will be understood by those of ordinary skill in the art that various changes in form and details may be made therein without departing from the spirit and scope of the present invention.

What is claimed is:

1. An apparatus for data transmission and reception in a mobile communication system, comprising: an antenna; a first switch configured to connect to the antenna and to bi-directionally control a path connectivity of a signal; an amplifier configured to connect to the first switch and to amplify the signal by either low noise amplifying or driving the signal: second and third switches configured to bi-directionally control a path connectivity of the signal through a mixer: the mixer configured to connect to the amplifier and to first convert a frequency of the signal by either up-converting or down-converting the signal: fourth and fifth switches configured to bi-directionally control a path connectivity of the signal through the mixer: a filter configured to connect to the mixer and to filter the signal; and a converter configured to connect to the filter and to convert the signal either from analog to digital or digital to analog.

2. The apparatus of claim 1, wherein the first switch bi-directionally processes the signal by switching between transmitting the signal to, or receiving the signal from, the antenna.

3. The apparatus of claim 2, wherein the signal transmitted to the antenna is a Transmission (Tx) signal, and the signal received from the antenna is a Reception (Rx) signal.

4. The apparatus of claim 3, wherein the bi-directions include a Tx signal direction and an Rx signal direction.

5. The apparatus of claim 1, further comprising;
sixth and seventh switches configured to bi-directionally control a path connectivity of the signal through the filter,
wherein the filter filters the signal by Tx or Rx filtering the signal, based on a connection of the sixth and seventh switches.

6. The apparatus of claim 5, further comprising;
eighth and ninth switches configured to bi-directionally control a path connectivity of the signal through the converter,
wherein the converter bi-directionally converts the signal by performing analog-to-digital conversion or digital-to-analog conversion of the signal, based on a connection of the eighth and ninth switches.

7. The apparatus of claim 1, further comprising:
an oscillator configured to connect to the mixer and to provide signaling to the mixer.

8. The apparatus of claim 1, wherein the apparatus is configured to be implemented in Wi-Fi and Bluetooth® Radio Frequency (RF) units.

9. A method for data transmission and reception in a mobile communication system, comprising:
processing, by a first switch connected to an antenna, a signal in one of bi-directions;
amplifying, by an amplifier connected to the first switch, the signal in the one of the bi-directions by low-noise amplifying or driving the signal, based on a connection of second and third switches;
first converting, by a mixer connected to the amplifier, the signal in the one of the bi-directions by up-converting or down-converting the signal, based on a connection of the fourth and fifth switches;
filtering, by a filter connected to the mixer, the signal in the one of the bi-directions; and
second converting, by a converter connected to the filter, the signal in the one of the bi-directions.

10. The method of claim 9, wherein the first switch processes the signal in the one of the bi-directions by transmitting the signal to, or receiving the signal from, the antenna.

11. The method of claim 10, wherein the signal transmitted to the antenna is a Transmission (Tx) signal, and the signal received from the antenna is a Reception (Rx) signal.

12. The method of claim 11, wherein the bi-directions include a Tx signal direction and an Rx signal direction.

13. The method of claim 9, wherein the filter filters the signal by Tx or Rx filtering the signal, based on a connection of sixth and seventh switches.

14. The method of claim 13, wherein the converter second converts the signal by performing analog-to-digital conversion or digital-to-analog conversion of the signal, based on a connection of an eighth switch.

15. The method of claim 9, further comprising:
connecting, by an oscillator, to the mixer and to providing signaling to the mixer.

16. The method of claim 9, wherein the method is configured to be implemented in W-Fi and Bluetooth® Radio Frequency (RF) units.

17. A non-transitory computer-readable recording medium having recorded thereon a computer program for executing a method for data transmission and reception in a mobile communication system, comprising:
processing, by a first switch connected to an antenna, a signal in one of the bi-directions;
amplifying, by an amplifier connected to the first switch, the signal in the one of the bi-directions by low-noise amplifying or driving the signal, based on a connection of second and third switches;
first converting, by a mixer connected to the amplifier, the signal in the one of the bi-directions by up-converting or down-converting the signal, based on a connection of the fourth and fifth switches;
filtering, by a filter connected to the mixer, the signal in the one of the bi-directions; and
second converting, by a converter connected to the filter, the signal in the one of the bi-directions.

* * * * *